Figure 8:
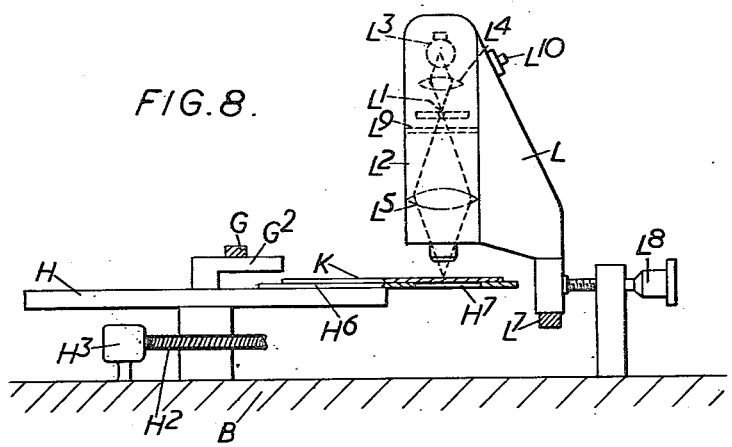

March 5, 1963 G. O. RAWSTRON ET AL 3,079,732
GENERATION OF ASPHERIC SURFACES
Filed Feb. 16, 1960 4 Sheets-Sheet 1
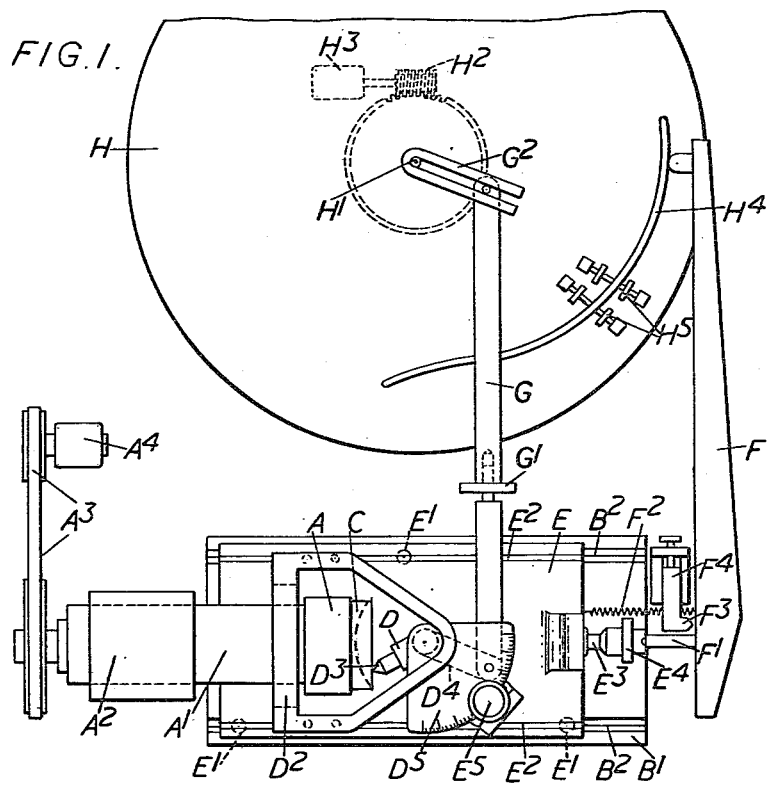
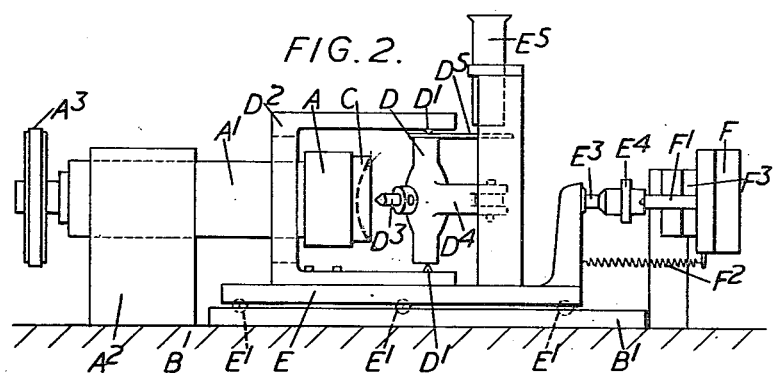
Inventors
G. O. Rawstron
R. E. Reason
By
Attorneys

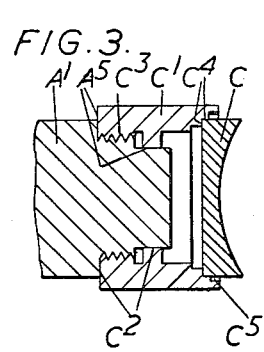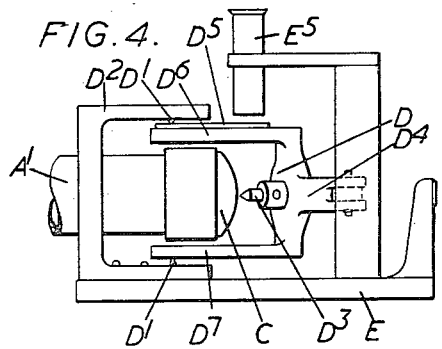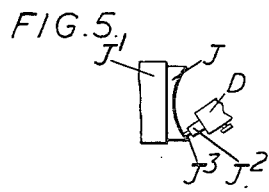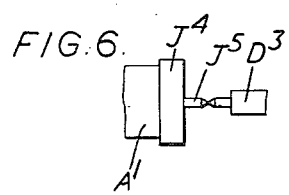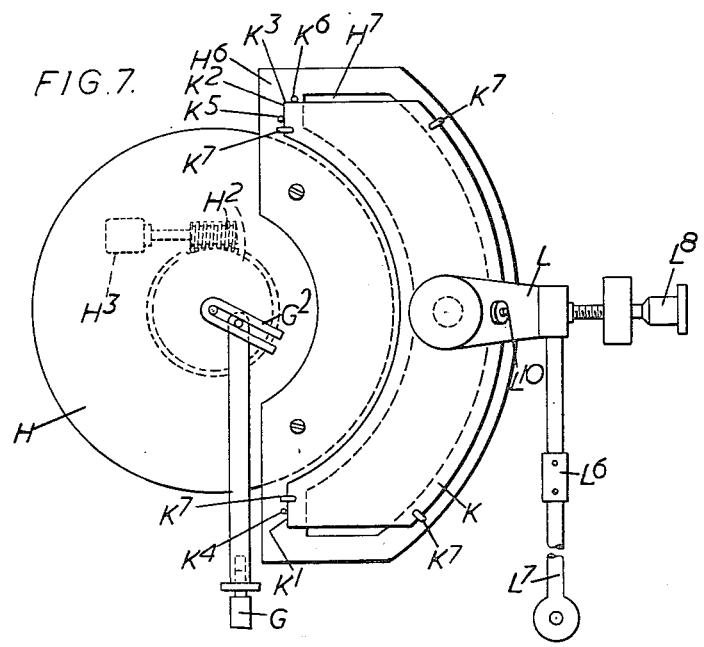
Inventors
G. O. Rawstron
R. E. Reason Inventors
G. O. Rawstron
R. E. Reason March 5, 1963  G. O. RAWSTRON ET AL  3,079,732
GENERATION OF ASPHERIC SURFACES
Filed Feb. 16, 1960  4 Sheets-Sheet 4
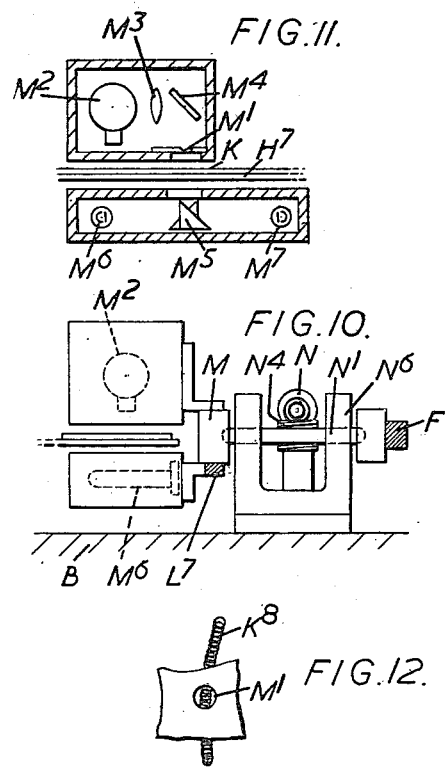
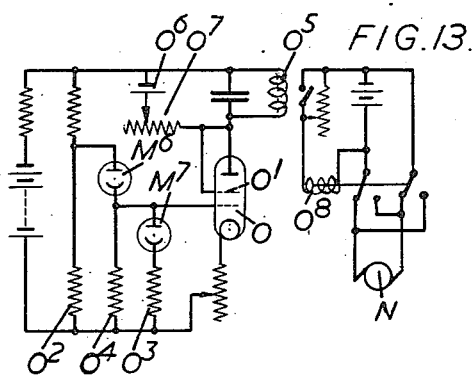
Inventors
G. O. Rawstron
R. E. Reason
By
Attorneys United States Patent Office 3,079,732
Patented Mar. 5, 1963

3,079,732
GENERATION OF ASPHERIC SURFACES
George Ormerod Rawstron and Richard Edmund Reason,
Leicester, England, assignors to Rank Precision Industries Limited trading as Taylor, Taylor & Hobson,
Leicester, England, a company of Great Britain
Filed Feb. 16, 1960, Ser. No. 9,088
Claims priority, application Great Britain Feb. 18, 1959
7 Claims. (Cl. 51—58)

This invention relates to apparatus for producing on a workpiece a surface of revolution, which deviates from a basic spherical surface by relatively small amounts at different radial distances from the axis of symmetry. Although applicable to other purposes, the invention is especially intended for the production of aspheric optical lens surfaces. Hitherto, it has been found necessary after the initial generation of the surface, for the surface to be finished by a laborious and highly expert figuring process in order to achieve the high degree of accuracy required for aspheric lens surfaces.

The present invention has for its object to provide a simple and efficient apparatus for generating the desired surface with so high a degree of accuracy as to render unnecessary any subsequent expert figuring process, so that the surface can be finished by a simple polishing process.

In the arrangement according to the present invention, the workpiece is rotated about its axis of symmetry, a relative rotational traversing movement between the workpiece and the tool is effected about a pivot axis which intersects the axis of symmetry at right angles at the centre of the basic spherical surface, and a relative translational correcting movement between the workpiece and the tool in accordance with the deviations of the desired surface from the basic spherical surface is effected in a direction lying parallel to a fixed reference axis in a plane at right angles to the pivot axis.

The relative correcting movement is preferably controled by a cam device shaped in accordance with the deviations of the desired aspheric surface from the basic spherical surface. The shape of such cam device is preferably determined in accordance with a chosen large multiple of the deviations, the correcting movement being derived therefrom through transmission mechanism having a reduction ratio dependent on such chosen multiple, relative movement between the cam device and the transmission mechanism being controlled in accordance with the rotational traversing movement between the workpiece and the tool.

In a preferred arrangement, the correcting movement is controlled by relative movement between an optical cam device, consisting of a sheet bearing a curved line which contrasts in respect of light-transmitting properties with the background constituted by the adjacent portions of the sheet, and an optical unit for following the curved line on the sheet. Such optical unit may act to direct a small beam of light through the sheet, any lateral displacement of the beam relative to the curved line on the sheet being detected photoelectrically for controlling movement of the optical unit relatively to the cam device to correct for such lateral displacement. The relative movement between the cam device and the optical unit is preferably effected by a reversible electric motor, whose direction of rotation is determined by the output of the photoelectric means, whereby such movement consists of small oscillations from one side to the other of the correct relative position determined by the cam device.

It is important to ensure accurate presetting of the workholder and toolholder relatively to the pivot axis to suit the radius fo the basic spherical surface, and this may conveniently be effected by mounting in the workholder an accurate spherical surface of such radius, mounting a gauge in the toolholder with its movable gauging element engaging with such spherical surface, effecting relative rotational traversing movement about the pivot axis between the gauging element and the spherical surface to ascertain any error in the radius of such rotation, effecting relative adjustment between the pivot axis, the workholder and the toolholder to correct for such error, removing the gauge from the toolholder and inserting the tool therein, adjusting the tool axially in the toolholder so as just to touch the spherical surface and locking the tool securely in such positon of adjustment, and removing the spherical surface from the workholder and inserting the workpiece therein. Care must be taken to avoid error due to tilt of the accurate spherical surface in its mounting in the workholder. Such error can be corrected prior to the presetting operation by relatively adjusting the toolholder and workholder about the pivot axis to bring the gauging element into engagement with a point on the spherical surface remote from the axis of symmetry, rotating the workholder about the axis of symmetry to ascertain the point of maximum error due to such tilt, adjusting the workholder about the axis of symmetry through one right angle from the position in which such point of maximum error engages with the gauging element, and holding the workholder in such positon of adjustment during the subsequent presetting operation.

The invention may be carried into practice in various ways, but some convenient alternative practical arrangements according thereto for accurately generating an aspheric surface deviating by relatively small amounts from a basic spherical surface, for example an aspheric lens surface, are illustrated somewhat diagrammatically by way of example in the accompanying drawings, in which FIGURE 1 is a plan view of one arrangement for generating a concave aspheric surface, FIGURE 2 is a front view of the arrangement of FIGURE 1, FIGURE 3 illustrates a convenient form of workholder for use in such arrangement, FIGURE 4 is a partial front view showing a modification of the arrangement of FIGURES 1 and 2 for generating a convex aspheric surface, FIGURES 5 and 6 are partial views illustrating a convenient method of accurately presetting the workpiece in the correct position.

Figure 9:
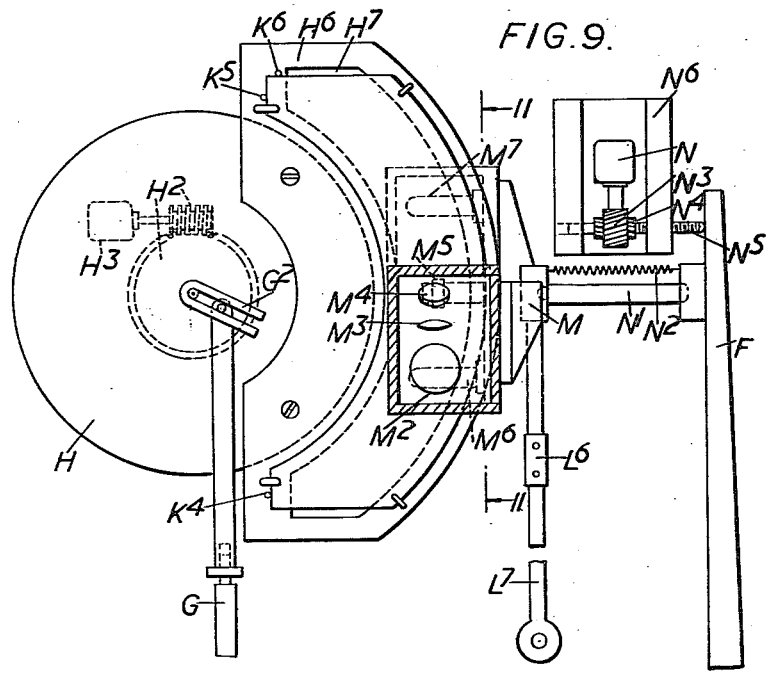

FIGURES 7 and 8 show respectively in plan view and in front view apparatus for producing an optical cam device for use in an alternative arrangement, FIGURE 9 is a plan view of such alternative arrangement for generating an aspheric surface with the aid of the optical cam device produced in the apparatus of FIGURES 7 and 8, FIGURE 10 is a partial front view of the arrangement of FIGURE 9, FIGURE 11 is a sectional view taken on the line 11—11 of FIGURE 9, FIGURE 12 illustrates the optical cam device used in the arrangement of FIGURES 9–11, and FIGURE 13 is a simplified circuit diagram of electrical apparatus employed in the arrangement of FIGURES 9–11.

In the arrangement of FIGURES 1 and 2, the workholder consists of a fitting A on the end of an accurate horizontal spindle $A^1$ journalled in a housing $A^2$ secured to a fixed base B, the spindle being driven through suitable coupling means $A^3$ by an electric motor $A^4$. The spindle $A^1$ is so mounted in its housing as to be substantially wholly devoid of any shake in its rotation, for example in one or other of the manners described in United States Patent No. 2,701,170. It is likewise important to ensure that the workpiece is accurately centered on the axis of the spindle. In the case of a lens, the workpiece C will usually consist of a cylindrical block of glass with its surface already moulded to a shape roughly approximating to the shape of the desired aspheric surface so that only a small amount of glass has to be removed to form the desired surface, such block being carried in a lens cell $C^1$. To ensure accuracy of mounting on the spindle $A^1$, the cell $C^1$ is provided (as shown in FIGURE 3) with accurately ground locating faces $C^2$ which cooperate with complementary faces $A^5$ provided on the end of the spindle $A^1$, the cell being secured on a loose screwthread $C^3$ so as to clamp such faces in engagement. The cell $C^1$ likewise has accurate seating faces $C^4$ for receiving the glass block C which will usually be held against such faces by wax in the annular recess $C^5$.

The toolholder D is mounted between vertical pivots $D^1$ on a frame $D^2$ secured to a carriage E, which can slide for example on three bearing balls $E^1$ on guide tracks $B^2$ on a slab $B^1$ on the base B, which are accurately parallel to the axis of the spindle $A^1$, the frame $D^2$ being provided with fine adjustment means, comprising slots $E^2$ in the carriage E to which the frame can be clamped, for ensuring accurate alignment of the pivot axis with the spindle axis, in a manner to be described later. The carriage E is moved along its guide tracks $B^2$ by means of a lever F through a connecting rod $F^1$ having rounded ends abutting respectively against the lever and against a projection $E^3$ from the carriage having a micrometer fitting $E^4$ for fine adjustment of the axial position of the carriage E relatively to the lever F, a spring $F^2$ being provided between the lever and the carriage to hold the parts in engagement. The tool $D^3$ itself fits adjustably in a cylindrical hole in the toolholder D and can be locked in its position of adjustment therein. The toolholder D carries a crank arm $D^4$ to which is pivoted a driving rod G extending laterally therefrom.

The other end of such driving rod G, which is also provided with a micrometer fitting $G^1$ for adjusting its length, is adjustably pivoted to a crank arm $G^2$ extending from a vertical spindle $H^1$ which is driven through worm gearing $H^2$ by another electric motor $H^3$. This spindle $H^1$ carries a horizontal table H, carrying a cam device, with which the other end of the lever F cooperates for effecting axial movement of the carriage E.

This cam device may be arranged in various ways, but in one simple form consists of a thin flexible steel strip $H^4$ clamped at a large number of points (as for example at $H^5$) along its length to the horizontal table H. The clamps $H^5$ are spaced at equal angular intervals approximately around an arc of a circle centered on the vertical spindle H and can be accurately adjusted radially with respect thereto to give the desired cam shape. These adjustments are made in accordance with calculated measurements to define the deviations of the desired aspheric surface from the basic spherical surface. When, as will usually be the case with an aspheric lens surface, these deviations are very small, the actual cam shape is preferably determined in accordance with a chosen large multiple of the deviations, for example two hundred times the calculated deviations, the lever F giving a 200:1 reduction ratio, to provide the correct deviating in the actual movement of the carriage E. The lever pivot indicated at $F^3$ is preferably adjustable, as indicated at $F^4$, to enable the reduction ratio to be varied, as may be convenient.

The toolholder D carries a segment $D^5$ bearing on its periphery a finely divided scale cooperating with an index mark on the carriage, and a microscope $E^5$ is provided on the carriage E for viewing such scale and index mark.

The construction of the toolholder D and its supporting frame $D^2$ shown in FIGURES 1 and 2 is intended for use when a concave aspheric surface is to be generated, but can be removed and replaced by a modified construction, as shown in FIGURE 4, for the generation of a convex aspheric surface. This modified construction differs from that of FIGURES 1 and 2, in that the toolholder D is provided with a pair of arms $D^6$, $D^7$ to enable the pivots $D^1$ to lie on the side of the workpiece C remote from the tool, the frame $D^2$ being modified in shape to hold the pivots $D^1$ in the desired position behind the workpiece, whilst the mountings of the associated parts are likewise modified, where necessary, to enable such parts to be correctly positioned relatively to the pivot axis.

The manner in which the apparatus is initially set to suit the generation of a particular aspheric surface, in accordance with calculated deviations from a basic spherical surface, will now be described.

First of all, a spherical lens J (FIGURE 5) having a surface corresponding accurately to such basic spherical surface is mounted in its cell $J^1$ on the end of the accurate spindle $A^1$ (care being taken to clean the lens seatings in the cell thoroughly to avoid positional errors due to dirt), and a precision gauge diagrammatically indicated at $J^2$ is fitted into the toolholder D with its movable gauging element $J^3$ projecting into engagement with the spherical surface, the carriage E having first been adjusted along its guide tracks $B^2$ so that the pivot axis of the toolholder D passes approximately through the centre of the spherical surface. The toolholder D is swung about its pivots so that the gauging element $J^3$ engages with a marginal point of the spherical surface, and is held in this position. The accurate spindle $A^1$ is now rotated at a slow speed and the gauge readings are watched. If, as may be the case, for example because of dirt not properly cleaned off from the cell seating or due to any untruth in the edging of the lens, the spherical lens J has a slight tilt, so that its centre is not quite accurately aligned on the spindle axis, the gauge readings will vary from a maximum to a minimum and back again during one complete revolution. The position of maximum error is noted and the spindle $A^1$ is rotated through exactly a right angle from such position. This will bring the points of maximum and minimum error vertically above and below the spindle axis, so that the horizontal section of the lens surface through the axis is substantially accurately circular. The spindle $A^1$ is now locked in this position.

The toolholder D is now swung about its pivots $D^1$ so as to traverse along this circular section of the lens surface. The gauge readings during such traverse will indicate whether the pivot axis is accurately aligned on the spindle axis and also whether such pivot axis is correctly at the centre of the spherical surface. The necessary adjustments to correct these errors are made, so that the gauge readings will remain constant (to the degree of accuracy required) during the traverse. The gauge J is now removed from the toolholder D and the tool $D^3$ inserted therein, the tool being adjusted in the holder D to the position in which it just touches the spherical surface. The tool $D_3$ is locked in the holder D in this position of adjustment. Whilst a sharply pointed diamond tool is usually preferable, it may be practicable in some instances to employ a driven diamond wheel, preferably using the relatively sharp edge thereof.

The spherical lens J is now removed from the spindle $A^1$ and replaced by a fitting $J^4$ (FIGURE 6) bearing a sharp steel point $J^5$ accurately centered on the spindle $A^1$, the parts being adjusted so that this steel point lines up with the point of the tool $D^3$. This ensures that the toolholder D is in its correct zero position, corresponding to the vertex of the lens surface, and the operator looks through the microscope $E^5$ to see that the scale is then properly registering the zero position. This scale is mounted adjustably on the toolholder D, so that any zero error can be corrected, and the scale is then locked in the correct position on the toolholder.

The parts are now ready for setting the cam device in accordance with the calculated deviations of the desired aspheric surface from the basic surface. The connecting rod G from the toolholder D to the vertical spindle $H^1$ is first adjusted along the crank arm $G^2$ on such spindle to give a suitable relationship between the angular rotations of the toolholder D and the rotatable table H for an adequate length of cam, and the lever ratio is chosen to suit the magnitude of the deviations, the lever pivot $F^3$ being suitably adjusted.

The cam strip $H^4$ is now clamped in position on the table H starting with the zero point, the table H and toolholder D being rotated step by step in accordance with the scale graduations viewed through the microscope $E^5$, the cam clamps $H^5$ being adjusted one by one to the correct positions to suit the chosen multiple of the deviations. When the cam $H^4$ has been accurately clamped in its correct position, the steel point fitting $J^4$ is removed from the accurate spindle $A^1$, and the cell $C^1$ containing the glass block C on which the aspheric surface is to be formed is mounted in position on the spindle $A^1$, care being taken to remove any dirt from the cell seatings to ensure accurate positioning of the glass block thereon. The toolholder D is swung round until the tool $D^3$ lies just off the edge of the glass block C, and the micrometer fitting $E^4$ is operated to move the carriage E axially to the position corresponding to the desired depth of cut on the block C.

The apparatus is now ready for the actual generation of the aspheric surface, and the two electric motors $A^4$ and $H^3$ are started up respectively to drive the accurate spindle $A^1$ and to traverse the toolholder D at the appropriate speed across the glass block C. As this traversing proceeds, the lever F, which engages with the cam $H^4$ in a radial direction relatively to the vertical spindle $H^1$, is moved by the cam so as to transmit to the carriage E the correct deviations, thereby ensuring accurate generation of the aspheric surface.

It should be mentioned that, since the carriage E moves in a direction parallel to the accurate spindle axis to effect the correcting movement in accordance with the deviations, the relative traversing and correcting movements operate on a system of combined polar and rectangular coordinates, and of course the deviations must also have been calculated on this bases. The fact that deviations calculated on such basis were applied to the cam $H^4$ on a truly polar coordinate basis is immaterial since the lever F engages with the cam in the radial direction and therefore receives the deviation movements from the cam on the same basis as they were applied to the cam.

In the foregoing arrangement the cam device is in the form of a thin flexible steel strip, but it is usually preferable in practice to employ an optical cam device consisting of a dark or opaque line on a translucent sheet or a translucent line on a dark or opaque sheet in conjunction with an optical follower unit. It is especially convenient to employ the arrangement forming the subject of the present applicants' copending United States patent application Serial No. 857,816, now abandoned, wherein such line is made up of a series of small dots at equal intervals, in the positions defined by the calculated measurements, the dots preferably being of such a size in relation to the intervals between dots that they overlap one another and form a continuous line, the actual cam line consisting of the line of centres of the dots.

Such optical cam device can be manufactured in various ways, but it is preferred to make it photographically in the manner forming the subject of the present applicants' United States patent application Serial No. 857,817. For this purpose (see FIGURES 7 and 8), an unexposed sensitive photographic plate K is mounted on a projection $H^6$ from the horizontal table H, such projection being provided with an arcuate slot $H^7$ (for a purpose to be described below) over which the plate K rests. The plate K is provided with two accurately ground surfaces $K^1$, $K^2$ on one of its longer edges and a third ground surface $K^3$ on one of its end edges, these three ground surfaces $K^1$, $K^2$, $K^3$ engaging with three locating pins $K^4$, $K^5$, $K^6$ on the projection $H^6$ from the table H, whereby it can be positioned with accuracy thereon. Clamps $K^7$ are provided to hold the plate K in the position determined by the locating pins $K^4$, $K^5$, $K^6$.

A phographic unit L, comprising a small aperture $L^1$ within a closed casing $L^2$ which also houses a source of light $L^3$, a condensing lens $L^4$ for concentrating the light on the aperture $L^1$ and an objective $L^5$ for focussing the aperture on the photographic plate K, is movably mounted so that the vertical optical axis of the beam of light passing through the aperture $L^1$ can move in a substantially radial direction with respect to the vertical axis of the horizontal table H. Since, however, its total movement is quite small, it will suffice for it to be mounted by a clamp $L^6$ on the end of a long pivoted arm $L^7$. The movements of the unit L are controlled by a micrometer head $L^8$, whereby such movements can be effected with a high degree of accuracy in accordance with calculated measurements. A shutter $L^9$ is provided in the casing $L^2$ of the photographic unit L, so as normally to shut off the light from the aperture $L^1$, this shutter $L^9$ being operated, for example, by a press button $L^{10}$ on the casing, to permit the light to pass from the aperture $L^1$, when desired.

This device is operated in a manner generally analogous to that above described for the setting of the steel strip cam. Thus the table H bearing the photographic plate K is rotated step by step through a number of closely spaced positions accurately determined by observing the graduations on the arcuate scale $D^5$ on the toolholder D through the microscope $E^5$. In each position, the micrometer head $L^8$ is operated in accordance with the appropriate calculated measurement, and when the photographic unit L has thus been positioned the shutter $L^9$ is opened to expose the small circular portion of the sensitive photographic plate K on which the light from the aperture $L^1$ is focussed, thus recording one of the desired round dots on the plate. It should be mentioned that on opaque screen (not shown) is provided to minimise risk of fogging the sensitive plate K by the light used for viewing the scale $D^5$ and setting the micrometer head $L^8$, the plate K itself being slow in order still further to minimise the risk of fogging.

When all the dots have been recorded, the sensitive plate K is removed and developed, to produce a photographic negative on which a curved line of dark or opaque round dots $K^8$ (see FIGURE 12) appears on a translucent background, such line of dots being shaped in accordance with the calculated deviations of the desired aspheric surface from the basic spherical surface. Such photographic negative K is preferably itself used to constitute the optical cam device, but it will be clear that, if it is preferred to use a cam device with translucent dots on a dark or opaque background, the negative may be photographically printed on to another precisely similar plate (likewise provided with the three ground portions on its edges) to form a photographic positive, which can be used as the optical cam device.

The plate K (whether negative or positive) is then replaced in position on the projection $H^6$ from the horizontal table H against the locating pins $K^4$, $K^5$, $K^6$, so that it will occupy exactly the same position as before. The photographic unit L is now removed from the long pivoted arm $L^7$, to be replaced by the optical follower unit, which cooperates with the optical cam device in practical use.

Such optical follower unit M (see FIGURES 9, 10 and 11) also includes a small circular aperture $M^1$, a source of light $M^2$ and a lens system $M^3$ for directing a vertical concentrated beam of light from the source $M^2$ through the aperture $M^1$. If the photographic negative K is used as the cam device, this aperture $M^1$ is made larger than that used during photographing, for example having twice the diameter thereof, as indicated in FIGURE 12. Although the source of light $M^2$ and the lens system $M^3$ may be mounted vertically above the aperture $M^1$, it is found more convenient, for reasons of compactness, for the light $M^2$ and lens system $M^3$ to have a horizontal axis, a small mirror $M^4$ inclined at 45 degrees to such axis being provided to deflect the beam vertically down through the aperture $M^1$. The follower unit M also includes a beam-splitting device $M^5$, lying vertically beneath the aperture $M^1$ with the optical cam device K between them, the arcuate slot $H^7$ in the projection from the horizontal table thus serving to permit the beam of light through the aperture $M^1$ to pass through the optical cam device K to the beam-splitting device $M^5$, which acts to deflect two parts of the beam respectively on to two photo-electric cells $M^6$ and $M^7$, also carried by the follower unit M. The operative beam-splitting plane of the beam-splitting device $M^5$ extends tangentially with respect to the vertical axis of the horizontal table H. Whilst the beam-splitting device $M^5$ may consist of an ordinary beam-splitting prism with its operative edge tangential with respect to such vertical axis, so that the two partial beams to the two photocells $M^6$, $M^7$ pass radially, inwards and outwards, with respect to such axis, it is found more convenient to use a different form of beam-splitting device (as shown), which will deflect the two partial beams in opposite directions parallel to the beam-splitting plane. This consists of two similar reflecting prisms side by side with their inclined reflecting surfaces facing in opposite directions, the prism sides in contact with one another lying in the beam-splitting plane.

The follower unit M is mounted on the long pivoted arm $L^7$, which previously carried the photographic unit L, care being taken to ensure that its small aperture $M^1$ follows the same substantially radial path with respect to the vertical axis of the horizontal table H as the aperture $L^1$ of the photographic unit L. The follower unit M is connected to the lever F, which operates the toolholder D, through a connecting link $N^1$ having ball ends engaging in recesses in the follower unit M and in the lever F, a spring $N^2$ being provided to maintain the parts in engagement.

The two photocells $M^6$ and $M^7$ are connected in a suitable electrical circuit (which may for instance take the form described in the specification of the copending application Serial No. 857,816, now abandoned, above mentioned) to control the operation of a reversible electric motor M, the arrangement being such that when the output of the first photocell $M^6$ exceeds that of the second $M^7$ the motor N is driven in one direction, whilst when the output of the second photocell $M^7$ exceeds that of the first $M^6$ the motor N is driven in the opposite direction. This motor N drives a worm $N^3$ engaging with a wormwheel $N^4$ on a rod $N^5$ which is in screwthreaded engagement with a fixed bracket $N^6$, so that the rod $N^5$ will move longitudinally in one direction or the other in accordance with the direction of rotation of the motor N. The rounded end of this rod $N^5$ engages either with the follower unit M itself or (as shown) with the lever F connected thereto.

Thus, when the horizontal table H is rotated to drive the optical cam device K slowly past the small aperture $M^1$ of the follower unit M, the beam of light through the aperture will pass through a small circular patch of the cam device, across the middle of which the line of dots $K^8$ passes. The light passing through the portion of such circular patch on one side of the line of dots $K^8$ passes to one photocell $M^6$, and that through the portion on the other side of the line of dots passes to the other photocell $M^7$. If the line of dots $K^8$ is not exactly central in the small circular patch, more light will pass to one photocell than to the other, with the result that the electric motor N will be caused to rotate so as to move the follower unit M in the direction to equalise the two portions of the circular patch on the two sides of the line of dots $K^8$. As will be clear from the description below of the electrical circuit shown in FIGURE 13, the follower unit M will in fact move past the position of equality, as the result of which the outputs of the two photocells $M^6$ and $M^7$ will be caused to differ in the opposite sense and will thereby cause the motor N to be reversed, thus bringing the follower unit M back again. The follower unit M will therefore be caused to oscillate backwards and forwards from one side to the other of its correct position as determined by the line of dots $K^8$. These oscillations can be made very small with suitable design of the electric circuit, but they will ensure highly sensitive following of the curve of the line of dots, and therefore highly accurate control of the movement of the tool $D^3$ for the generation of the aspheric surface.

It should be mentioned that for satisfactory beam-splitting action, the cam line should not become too steeply inclined to the operative beam-splitting plane, and it is found that the angle between the cam line and such plane should not be greater than about 30 degrees. In practice, however, this does not present serious difficulty, for a reduced inclination can be used if the lever reduction ratio is reduced. When generating the cam device, therefore, the operator should in general choose as large a reduction ratio (within the available range) as is possible without involving an excessive inclination of the cam line to the beam-splitting plane.

Full details of a preferred arrangement of the electrical circuit are given in the specification of the copending application No. 857,816, now abandoned, above mentioned, but a simplified form of such circuit is shown in FIGURE 13. This circuit includes an electronic valve O, the potential of the grid $O^1$ of which is controlled by a circuit resembling a bridge circuit, including the two photocells $M^6$ and $M^7$ in two of its arms, whilst the other two arms contain resistances $O^2$ and $O^3$, a further resistance $O^4$ being connected across the diagonal of the bridge. The arrangement is such that when the photocell outputs are balanced, sufficient anode current flows to close a sensitive relay $O^5$ in the anode circuit. A shunt circuit is connected across such relay containing an auxiliary bias supply $O^6$ and a variable resistance $O^7$, for bringing the relay into a critical operating condition by passing a current in opposition to the anode current of the valve O. The contacts of the relay $O^5$, which open and close in response to variations in the anode current of the valve O, control the energisation and deenergisation of a contactor $O^8$ for reversing the energisation of the motor N. This circuit gives highly sensitive control of the motor N, so that it will oscillate rapidly between its forward and reverse drives, in response to the photocell outputs, thereby enabling the follower unit M to follow the line of dots $K^8$ with a high degree of accuracy as the table H is rotated, thereby ensuring highly accurate generation of the aspheric surface in accordance with the deviations from the basic spherical surface determined by the shape of the optical cam device.

If it is desired to use the photographic positive, instead of the negative, for the optical cam device, the aperture in the optical follower unit should perferably be made of the same size as that used in photographing, and the follower unit should also be provided with a graticule having a fairly thick straight line marking in the path of the light between the aperture and the beam-splitting device, such straight line lying in the beam-splitting plane. Thus, as each of the translucent dots of the cam device comes in its turn beneath the aperture, any lateral displacement relatively to the beam-splitting plane will be revealed by the different amounts of light passing on the two sides of the graticule line respectively to the two photocells.

It should be noted that such straight line graticule will operate satisfactorily for splitting the beam, even if the spacing between consecutive dots in the line is such that the dots do not overlap one another. This makes it practicable, if desired, to manufacture an optical cam device by punching small holes through an opaque sheet in the appropriate accurately measured positions, without unduly weakening the sheet by overlapping consecutive holes and thus producing a continuous cam slot. In a similar way, the straight line graticule can be used with a row of dark or opaque dots on a translucent background, when such dots do not overlap one another.

Again, it is not essential to use round dots to make up the cam line of the optical cam device, and patches of other shape can be employed, if desired, by the use of an aperture other than circular in the photographic unit. Round dots, however, are usually preferable, since their use will permit satisfactory operation over a greater range of inclinations of the cam line to the beam-splitting plane than patches of other shape.

It is also not essential to the invention, for the horizontal table H which carries the cam device to rotate about a pivot axis, and such table could, for instance, if desired, perform a straight line translational movement, appropriately interrelated to the rotary movement of the tool $D^3$. In such case, the cam device (whether in the form of a mechanical cam or of an optical cam device) would take the form of a curve differing from a straight line (instead of a circle) in accordance with the deviations of the desired aspheric surface from the basic spherical surface. The step by step movement of the table during generation of the cam device would of course take place along exactly the same path as its subsequent movement during manufacture of the aspheric surface.

In the foregoing arrangements, the workholder has been stationary, except for its rotation about its own axis, and both the rotational traversing movement about the centre of the basic spherical surface and the translational correcting movement in accordance with the deviations of the desired aspheric surface from the basic spherical surface, have been applied to the toolholder, such arrangements operating on a combined polar and rectangular system of coordinates. It will be appreciated, however, that a variety of inversions of such movements can be employed instead, if desired.

Thus, for example, the translational correcting movement could be applied to the workholder in the direction of its axis of rotation, by mounting the housing for the accurate spindle $A^1$ on a slide moved by the lever F, whilst the rotational traversing movement is applied to the toolholder D about pivots mounted on a slab on the fixed base E, fine adjustment of the pivot axis being effected by movement of the frame $D^2$ carrying the pivots along slots in such fixed slab.

Or again, the toolholder D may remain fixed in position, whilst both the rotational traversing movement and the translational correcting movement are applied to the workholder. This can be effected by mounting the housing $A^2$ for the accurate spindle (together with the motor $A^4$ and coupling $A^3$) on a slab pivoted about a vertical axis intersecting the spindle axis, the pivots being carried on a frame carried by a slide moved by the lever F, whilst the toolholder D is fixed in position on the base B, fine adjustment of the pivot axis being effected by movement of the frame along slots in the slide.

Both such variants would operate on the same combined polar and rectangular system of coordinates.

What we claim as our invention and desire to secure by Letters Patent is:

1. Apparatus for producing on a workpiece by means of a tool an aspheric surface of revolution which deviates from a basic spherical surface by relatively small amounts at different radial distances from the axis of symmetry, said apparatus comprising a fixed base, a workholder for carrying the workpiece, means for rotating the workholder about an axis constituting the said axis of symmetry, a tool holder for carrying the tool in operative relationship to the workpiece on the workholder, a pivot element mounting means on the base for locating the workholder and the toolholder relatively to the pivot element whereby the axis of such pivot intersects the axis of rotation of the workholder at right angles at a point constituting the center of the said basic spherical surface, means for applying to the workholder and the toolholder a relative rotational traversing movement about the fixed pivot axis, an optical cam device consisting of a sheet bearing a curved line which contrasts in respect of light-transmitting properties with the background constituted by the adjacent portions of the sheet and has a shape dependent upon the deviations of the desired aspheric surface from the basic spherical surface, an optical unit cooperating with the optical cam device, means controlled in accordance with the relative rotational traversing movement between the workholder and the toolholder for effecting a relative traversing movement between the optical cam device and the optical unit, means controlled by the optical unit for causing relative working movements between the optical unit and the optical cam device to take place transversely to such relative traversing movement whereby the optical unit is caused accurately to follow the curved line of the optical cam device, transmission means operated in accordance with such relative working movements for effecting a relative translational correcting movement between the workholder and the toolholder in accordance with the deviations of the desired aspheric surface from the basic spherical surface, such translational correcting movement being superimposed on the relative rotational traversing movement between the workholder and the toolholder, and means whereby such superimposed translational correcting movement is caused to take place in a fixed direction in a plane at right angles to the fixed pivot axis.

2. Apparatus as claimed in claim 1, in which the optical unit comprises a source of light, means for directing a small beam of light from such source through the optical cam device, and photoelectric means sensitive to lateral displacement between such beam of light and the curved line of the optical cam device for giving an electrical output for the control of the means for causing the relative working movements between the optical unit and the optical cam device to correct for such lateral displacement.

3. Apparatus as claimed in claim 2, in which the means for causing the relative working movements between the optical unit and the optical cam device comprises a reversible electric motor and electrical circuit means for controlling the direction of rotation of the motor in accordance with the output of the photoelectric means whereby the relative working movements consist of small oscillations from one side to the other of the correct relative position determined by the curved line of the optical cam device.

4. Apparatus as claimed in claim 3, in which the shape of the curved line of the optical cam device is determined in accordance with a chosen large multiple of the deviations of the desired aspheric surface from the basic surface, and the transmission means has a reduction ratio dependent on such chosen large multiple.

5. Apparatus for producing on a workpiece by means of a tool an aspheric surface of revolution which deviates from a basic spherical surface by relatively small amounts at different radial distances from the axis of symmetry, said apparatus comprising a fixed base, a workholder for carrying the workpiece, means for rotating the workholder about an axis constituting the said axis of symmetry, a toolholder for carrying the tool in operative relationship to the workpiece on the workholder, a pivot element mounting means on the base for locating the workholder and the toolholder relatively to the pivot element whereby the axis of such pivot intersects the axis of rotation of the workholder at right angles at a point constituting the center of the said basic spherical surface, means for applying to the workholder and the toolholder a relative rotational traversing movement about the fixed pivot axis, the said mounting means including a carriage, a slideway for constraining such carriage to move only in a fixed direction in a plane at right angles to the fixed pivot axis and means whereby movement of the carriage causes a relative translational correcting movement between the workholder and the toolholder in such fixed direction to be superimposed on the relative rotational traversing movement, and means for controlling the movement of the carriage in accordance with the deviations of the desired aspheric surface from the basic spherical surface whereby the resultant relative movement between the workholder and the toolholder is caused to conform to the shape of the desired surface.

6. Apparatus as claimed in claim 5, in which the means for controlling the movement of the carriage includes a cam device shaped in accordance with the deviations of the desired aspheric surface from the basic spherical surface, transmission means for effecting movement of the carriage in accordance with the shape of the cam device, and means for effecting relative movement between the cam device and the transmission means in accordance with the relative traversing movement between the workholder and the toolholder.

7. Apparatus as claimed in claim 6, in which the shape of the cam device is determined in accordance with a chosen large multiple of the deviations of the desired aspheric surface from the basic spherical surface, and the transmission means has a reduction ratio dependent upon such chosen large multiple.

References Cited in the file of this patent

UNITED STATES PATENTS

| | | |
|---|---|---|
| 2,558,771 | Middaugh | July 3, 1951 |
| 2,568,040 | Touvay | Sept. 18, 1951 |
| 2,725,776 | Hopkins | Dec. 6, 1955 |
| 2,733,510 | Darogo | Feb. 7, 1956 |